(12) United States Patent  
Curtiss

(10) Patent No.: US 7,653,957 B1
(45) Date of Patent: Feb. 2, 2010

(54) COLLAPSEABLE UTILITY RAMP

(76) Inventor: Mark Edward Curtiss, 3312 Chaparral La., Ft Worth, TX (US) 76109

( * ) Notice: Subject to any disclaimer, the term of this patent is extended or adjusted under 35 U.S.C. 154(b) by 0 days.

(21) Appl. No.: 12/151,402

(22) Filed: May 7, 2008

(51) Int. Cl.
*E01D 1/00* (2006.01)

(52) U.S. Cl. .................................. 14/69.5; 414/537

(58) Field of Classification Search ............ 14/69.5; 414/537
See application file for complete search history.

(56) References Cited

U.S. PATENT DOCUMENTS

| 854,329 | A | * | 5/1907 | Charron | 14/2.4 |
|---|---|---|---|---|---|
| 3,472,183 | A | * | 10/1969 | Goodman | 108/147 |
| 3,785,462 | A | * | 1/1974 | Coed et al. | 187/262 |
| 4,585,212 | A | * | 4/1986 | Yanker | 254/122 |
| 5,319,818 | A | * | 6/1994 | Baranowski | 14/71.1 |
| 5,503,368 | A | * | 4/1996 | Torres | 254/88 |
| 5,634,228 | A | * | 6/1997 | Johnston | 14/69.5 |
| 7,069,611 | B2 | * | 7/2006 | Larson | 14/71.3 |
| 7,299,517 | B1 | * | 11/2007 | Adinolfe | 14/69.5 |

* cited by examiner

*Primary Examiner*—Raymond W Addie

(57) ABSTRACT

A utility ramp for loading and unloading lawn mowers and other equipment into a pickup truck or transport vehicle and then collapsed for easy storage. The ramp is a comprehensive unit comprising two ramp channels held parallel by a sliding cross brace design. The first end of the cross brace is pivotally attached the ramp channel. The second end of the cross brace is secured to a rotating sliding fitting that engages a slot in the ramp channel. The sliding cross brace design constrains the ramp sections in a secure and parallel fashion in both the expanded and collapsed positions. This design allows one person to easily and quickly expand or collapse the utility ramp with one simple motion.

2 Claims, 3 Drawing Sheets

COLLAPSEABLE UTILITY RAMP

BACKGROUND

The present invention relates to ramps used with pickup trucks, more specifically to a new design that easily expands to an open position allowing a lawn mower to be pushed up into a pickup truck bed and then easily collapsed for convenient storage.

The use of pickup truck loading ramps is well known in prior art. Many devices in this crowded field are used for medium weight mobility vehicles and off-road vehicles. Although these devices fulfill their respective objectives they are often cumbersome and difficult to operate by a single individual. Other devices consist of overly complex designs that are expensive to manufacture.

U.S. Pat. No. 5,634,228 to Johnson describes a mobility aid ramp that may be folded. However, this ramp consists of three channels and a plethora of rods making it heavy, expensive to manufacture, and difficult to deploy. Also the parallel pattern of the flat rods while in the expanded position renders less longitudinal stability than a diagonal crossing pattern.

U.S. Pat. No. 7,174,592 to Nyhus describes a ramp that folds lengthwise. This device would require two units set side by side or one prohibitively wide unit.

U.S. Pat. No. 6,059,344 to Radosevich describes a ramp system requiring a set of ramps, not a single comprehensive unit that can be expanded and collapsed.

U.S. Pat. No. 5,440,773 to Lentini describes a foldable ramp with many sections. In order to transport any four wheeled piece of equipment, a pair of ramps would be required. This again is cumbersome and difficult to store.

U.S. Pat. No. 854,329 to Charron describes a portable bridge with one diagonal cross brace but must be broken down and then reassembled after each use.

The aforementioned patents fulfill their respective needs but do not describe a comprehensive utility ramp that can be expanded or collapsed in one simple motion. Therefore, a continuing need is apparent for a utility ramp that easily expands and contracts, has substantial strength with few parts, and is cost efficient to manufacture.

OBJECTS AND ADVANTAGES

Accordingly, it is an object of the present invention to provide a strong, light, and economical utility ramp. The device in its present embodiment is easily and quickly opened into an expanded position with one simple motion. It is equally easy to collapse into a stowed position. The device allows one person to readily load lawn mowers and other equipment into a pickup truck or other transport vehicle. It is understood that the invention is not limited in its application to the details of construction or to the arrangements of the components set forth in the following description and illustrated drawings. Phraseology and terminology are understood to be descriptive only and not limiting.

It is therefore an object of the present invention to provide a new and improved utility ramp which may be efficiently manufactured at an affordable price.

It is another object of the present invention to provide a new and improved utility ramp that has fewer elements and less components than the prior art.

It is still another object of the present invention to provide a new and improved utility ramp that is a comprehensive unit that may easily be expanded or collapsed with one simple motion.

It is yet another object of the present invention to provide a new and improved utility ramp that may be easily stored and efficiently uses space in a transport vehicle.

Lastly, it is an object of the present invention to provide a new and improved utility ramp that is structurally strong, light, and simple to operate.

SUMMARY OF THE INVENTION

The present invention overcomes the many disadvantages found in prior art. The device comprises two ramp channels held together in a restrained and parallel fashion by a sliding cross brace design with an integral width stop. This sliding cross brace design provides many unexpected results. While having fewer elements the device has improved longitudinal stability. It can be expanded or collapsed in one simple motion by one individual. The device is both light and strong. Fewer elements and simple design features make this device extremely cost effective to manufacture and more affordable to the consumer. The sliding cross brace design provides a simple, light, strong, and economical, collapsible utility ramp.

BRIEF DESCRIPTION OF THE DRAWINGS

The following drawings describe the present invention.

DETAILED DESCRIPTION OF THE INVENTION

The present invention will now be more fully described in a static condition. With reference to the drawings like numerals represent like parts throughout the figures.

Figure 1:
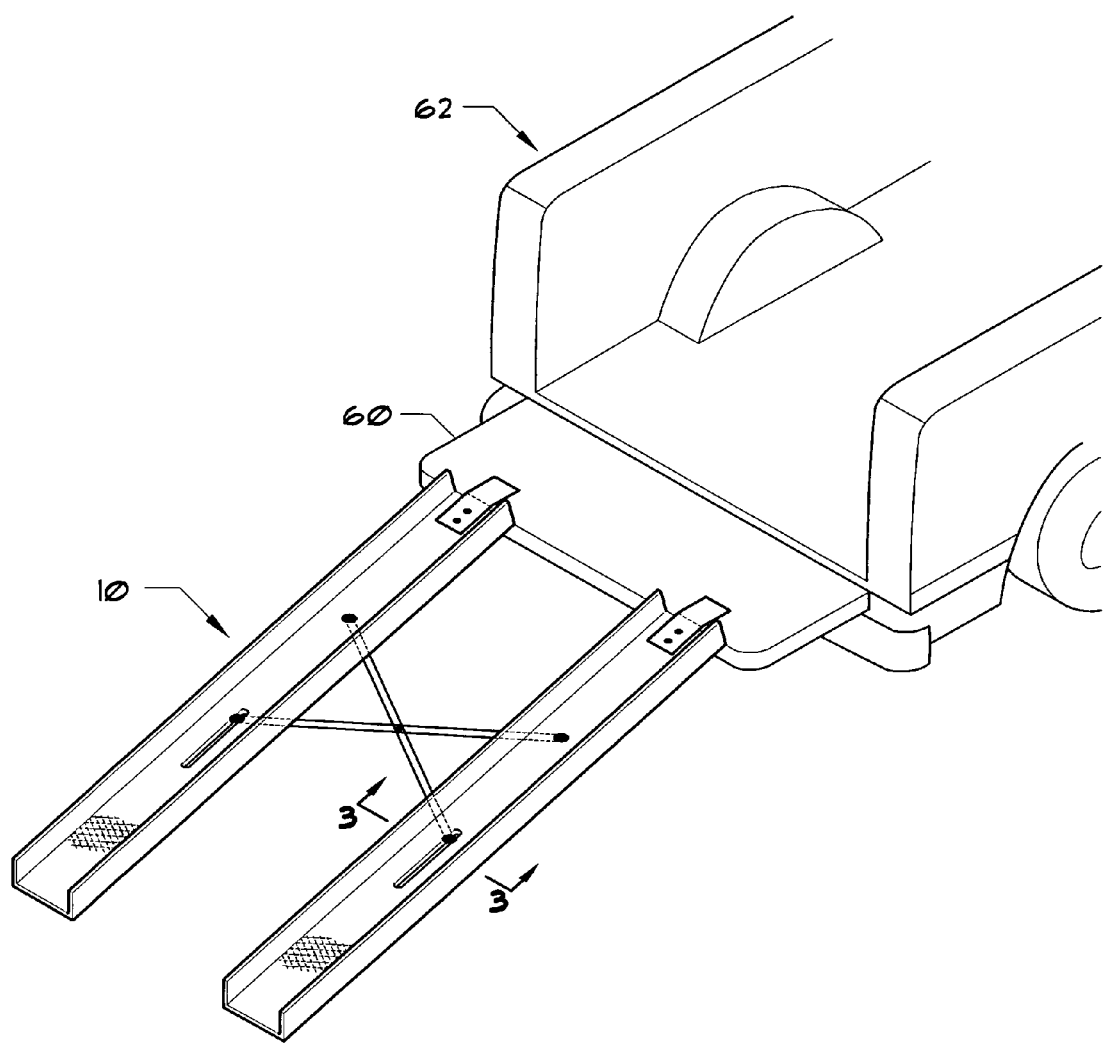
FIG. 1 is a perspective view of the preferred embodiment of the collapsible utility ramp. It is shown in the expanded position deployed against a pickup truck tail gate.

Referring to FIG. 1 shows a perspective view of the utility ramp 10 in the expanded position. The utility ramp is engaging the tailgate 60 of a pickup truck 62.

Figure 2:
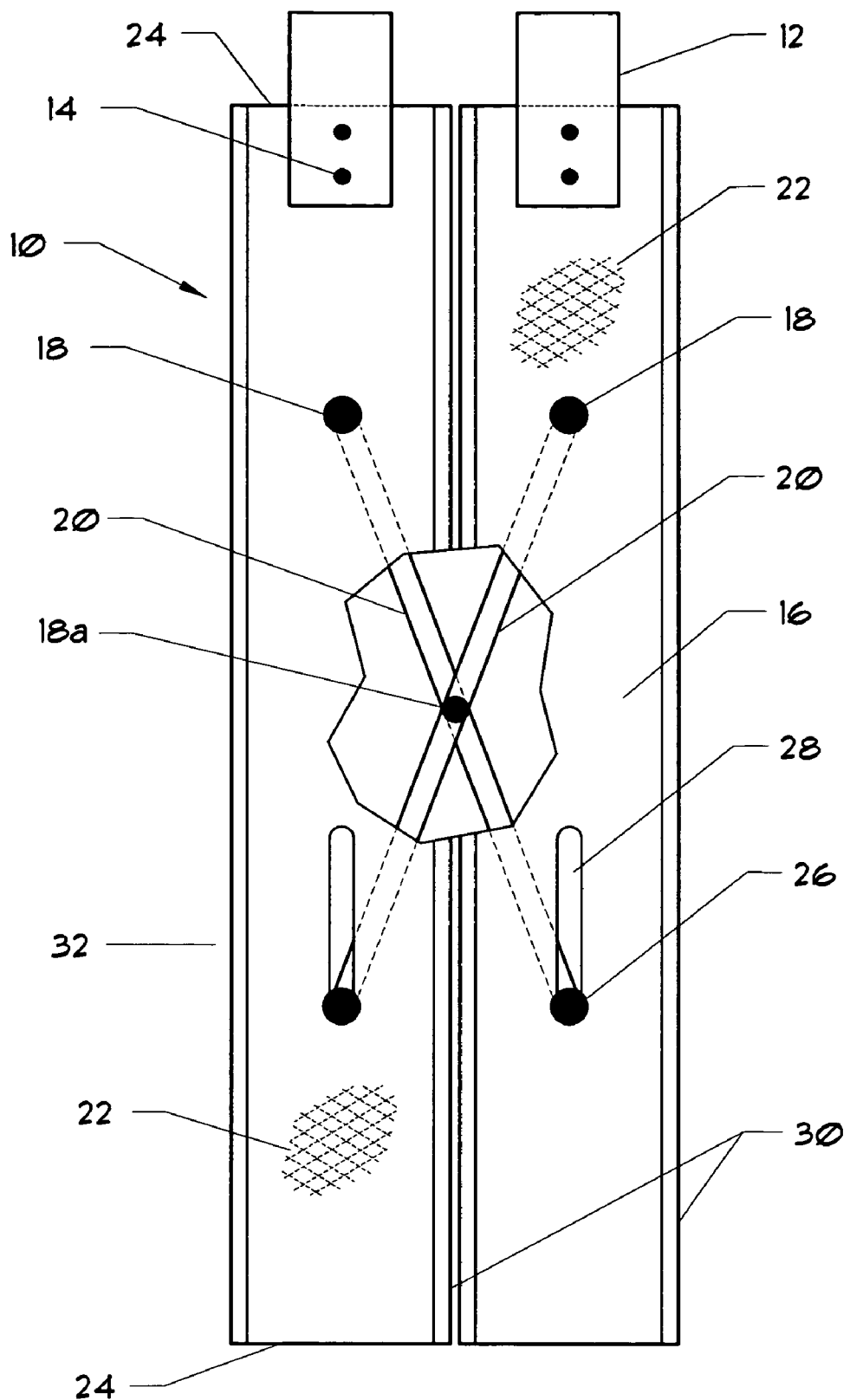
FIG. 2 is a plan view of the preferred embodiment of the collapsible utility ramp in the collapsed position.

Referring to FIG. 2 the utility ramp 10 is in the collapsed position. The device comprises two elongated ramp channels 32. Each elongated ramp channel comprises a generally planar elongated member 16, two sidewall portions 30, and open end portions 24. One sidewall portion is integral to the left side of the elongated member and one sidewall portion is integral to the right side of the elongated member, forming a channel. Each elongated member has a plurality of non-skid surfaces 22 disposed thereon. The elongated members are pivotally coupled 18 to a first end of two cross bars 20. The cross bars are pivotally coupled 18a to one another near their midpoint. The second end of the cross bars are pivotally connected to a rotating sliding fitting 26. The rotating sliding fitting engages an elongated slot 28 integral to the elongated member. The longitudinal position of this elongated slot along the axis of the elongated member creates a stop. This stop accounts for the width of the ramp channels in the expanded position. Each elongated member has an engaging flange 12 attached by a fastener 14 to an open end. The engaging flange is angled acutely with respect to the longitudinal axis of the elongated member and rests on a pickup truck tailgate or sill of a transportation vehicle.

Figure 3:
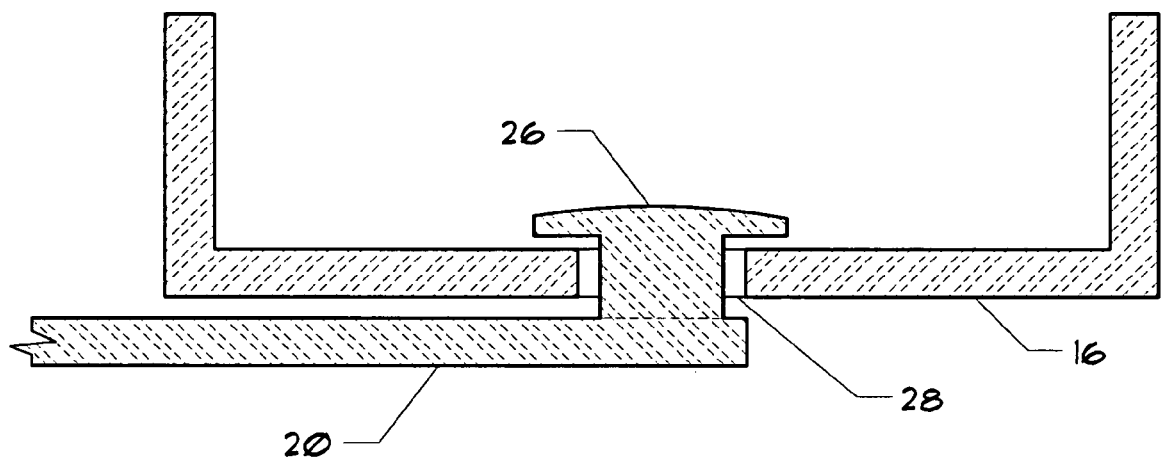
FIG. 3 is a cross sectional view of the rotating sliding fitting taken along line 3-3 of FIG. 1.

Referring to FIG. 3 shows a cross sectional view of the rotating sliding fitting 26. The rotating sliding fitting engages a slot 28 in an elongated member 16. The rotating sliding fitting is fastened to the second end of a cross bar 20.

The manner of usage and operation of the present invention should be apparent from the foregoing description. With respect to the above description, it is understood that optimal dimensional relationships for the parts of the invention to include variations in form, size, shape, and material are to be deemed readily apparent and obvious to one skilled in the art.

The invention claimed is:

1. A Utility ramp comprising:
   a. a first elongated member, having a first end with a first hole and a second end with a first slot,
   b. a second elongated member, having a first end with a second hole, and a second end with a second slot,
   c. a first crossbar, having a first rotary fitting in a first end for attaching to the first hole in the first elongated member in a rotating fashion, the first crossbar having a first rotating sliding fitting at a second end for attaching to the second slot in the second elongated member in a rotating sliding fashion, the first crossbar having a middle portion midway between the first end and the second end,
   d. a second crossbar, having a second rotary fitting in a first end for attaching in the second hole in the second elongated member in a rotating fashion, the second crossbar having a second rotating sliding fitting at a second end for attaching to the first slot in the first elongated member in a rotating sliding fashion, the second crossbar having a pivoting fitting at a middle portion for attaching to the middle portion of the first crossbar, whereby the first elongated member and the second elongated member are constrained to be parallel to one another when apart in an expanded position, and the first elongated member and the second elongated member are constrained to be parallel to one another when together in a collapsed position.

2. The utility ramp in claim 1 wherein the expanded position is defined by the first rotating sliding fitting striking an integral stop.

* * * * *